United States Patent Office 3,817,816
Patented June 18, 1974

3,817,816
RESTRICTED THERMO FLOW HEAT SEAL NEST FOR CONTAINERS
William E. R. Watt, Barto, Pa., assignor to Impaco, Allentown, Pa.
Filed Mar. 14, 1972, Ser. No. 234,525
Int. Cl. B30b 15/34; B65b 7/06
U.S. Cl. 156—583
5 Claims

ABSTRACT OF THE DISCLOSURE

A heat sealing nest for containers that includes a reduced supporting surface area in the form of teeth or ridges or serrations, for controlling the transfer of heat from a sealing platen through a cover and container to the actual nest.

---

This invention relates to the heat sealing of closures on containers, and more particularly to the use or provision of a reduced surface area to prevent the rapid transfer of heat from the sealing platen on top through the cover and container into the actual nest.

The primary object of the present invention is to provide a reduced surface area on a heat seal nest made of a material such as stainless steel wherein a serrated surface will supply limited contact to a metal container or the like, and wherein the serrated surface will also offer some cushioning effect in high pressure areas for better sealing ring contact.

Another object is to provide a method and means of the character described that is economical to produce, durable in form and conducive to the most economical use of materials and uniformity of members formed therefrom.

Still further objects and advantages will become apparent in the subsequent description in the specification.

Figure 1:
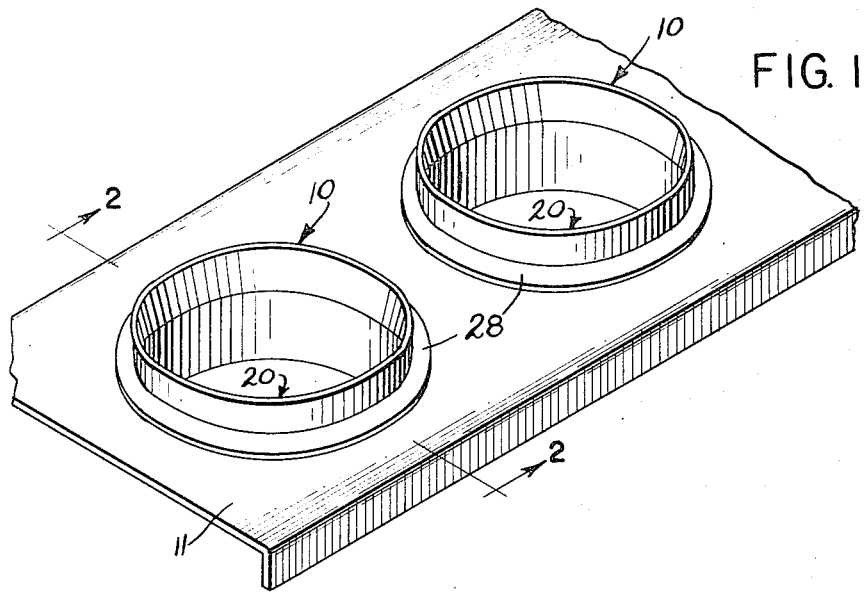
FIG. 1 is a fragmentary perspective view illustrating one application of the present invention.
Figure 2:
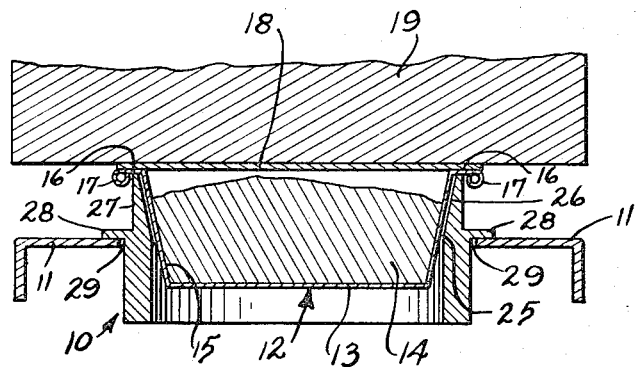
FIG. 2 is a sectional view generally taken on the line 2—2 of FIG. 1, and showing the present invention in use.

Referring in detail to the drawings, there is illustrated a thermo flow heat sealing arrangement wherein the numeral 10 indicates a nest that is mounted in a support member 11 that can form part of a conveyor of a conventional packaging machine, and the numeral 12 in FIG. 2 indicates a container such as an aluminum foil container that includes a horizontally disposed flat bottom wall 13, as well as an inclined side wall 15 and a horizontally disposed outwardly projecting flange portion 16 that terminates in a bead or rim 17. The numeral 14 indicates material 14 may be of any desired type, such as a food product, beverage, pharmaceuticals, or the like.

As shown in FIG. 2, the numeral 18 indicates a closure or cover that is adapted to be heat sealed to the top of the container 12, and the numeral 19 indicates a top platen for supplying heat or the like to the device.

Figure 3:
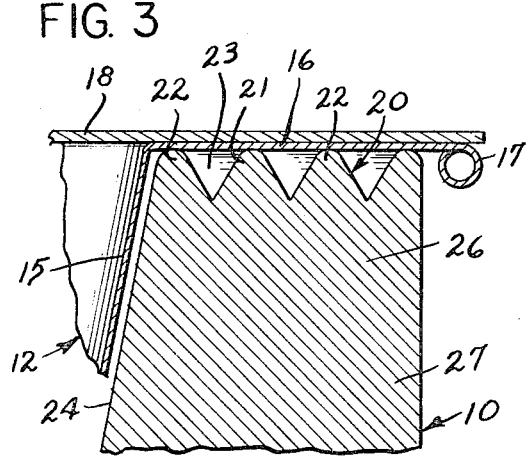
FIG. 3 is an enlarged fragmentary sectional view illustrating the reduced serrated edge or surface.

As shown in FIG. 3, for example, the nest 10 includes a generally upstanding side wall 27 that may have a shoulder portion or flange portion 28 for maintaining the nest supported in an opening 29 to the member 11. The top surface of the side wall 27 is serrated or of reduced size as indicated by the numeral 20 for a purpose to be later described. Thus, as shown in FIG. 3, a plurality of V-shaped teeth 21 may be provided in the top surface of the side wall 27, and the numeral 23 indicates recessed areas or cutouts that are defined between the teeth 21.

The numeral 22 indicates the radiused pointed ends on the upper ends of the teeth or serrated portions or ridges 21.

Figure 4:
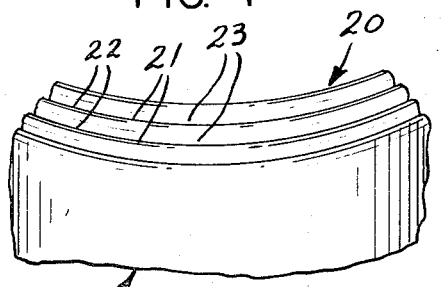
FIG. 4 is a fragmentary perspective view of the serrated area.

In addition, as shown in FIG. 3, the surface such as the outer surface 24 of the side wall 27 in the vicinity of the teeth 21 may be inclined or beveled as at 24, and this bevel or incline may start at a point generally indicated by the numeral 25 in FIG. 4, so that the upper edge 26 is of less thickness in cross section than the lower edge in the vicinity of the point 25.

From the foregoing, it will be seen that there has been provided a sealing nest arrangement for containers such as the aluminum foil containers 12. In use, with the parts arranged as shown in the drawings, one or more nests 10 are adapted to be suitably supported in a member such as the member 11, and the containers 12 are adapted to be supported by the nests 10, as shown in FIG. 2. The platen 19 serves to heat seal the closure 18 on the horizontal portion 16 of the container 12, after the container 12 has been filled with the desired quantity of the material 14. The platen 19 may be hot, or it could be an impulse or induction type.

In accordance with the present invention, the upstanding wall portion 27 of each nest 10 has a reduced surface area, as indicated by the numeral 20, and this may be provided by forming serrations or teeth or concentric ridges 21 in the top edge portion of the nest. The wall portion 27 may be cylindrical, square, rectangular or any other shape.

In addition, the area in the vicinity of the teeth 21 has a tapered configuration as shown in FIG. 4, as defined or provided by a surface such as the inclined surface 24 so that the upper pointed ends of the teeth, as indicated by the numeral 26, are of less thickness than the lower portion thereof. This has the effect of reducing the area at the top edge of the nest to accomplish the desired results.

The parts can be made of any suitable material and of different shapes or sizes, as desired or required.

With the present art of heat sealing aluminum containers, complications have arisen because a suitable nest material and configuration must afford the necessary heat barrier to prevent heat losses through the supporting flange when heat is applied by a heated platen such as the platen 19 through the cover such as the cover 18 that would otherwise prevent the thermal activation of the container/cover heat seal coatings. Also, it is necessary that a material be used that will be dimensionally heat stabled and moisture resistant from the frequent washdowns required in all machines such as packaging machines used in the food industry and the like. In the present invention, the heat seal coatings of both the container and cover are activated.

At the present time the commonly used material, from a thermo barrier standpoint, are the micartas. The linen/phenolic type is subject to heat deformation and moisture absorption. The melamine/glass type is brittle and friable when subjected to impact from tools and the like laid on them during machinery repair, or at other times. Attempts at using a stainless steel heat seal nest of the same flat heat seal nest surface configuration, have shown it to be too great a heat sink, robbing heat from the flange of the container and thus requiring higher platen temperatures over a longer period of time when using the accepted heat seal coating weights of between 2½ lbs. and 4 lbs./R on both the foil type container and covers.

In accordance with the present invention, a ring such as a stainless steel nest is used that has circumferential serrations machined into the flat of each heat sealing nest at the top surface, as shown in the drawings.

The following is given as examples illustrating the present invention. Heat seal nest have been made up for a 75 mm. 4 oz. cup having a flange sealing width of .100 inches, and three serrations having a .005 inch top radius were machined into the sealing surface of a stainless steel nest. Flat surface sealing nests of the same sealing configuration were made of stainless steel, aluminum, melamine/glass Micarta and phenolic/linen Micarta. The control point, using the Micarta nests with an embossed .002 inch thick flat foil closure having a 2½ lb. heat seal coating, was found (at 1½ seconds dwell, 1507 lbs. total force and 320° F. platen surface temperature) to afford a seal integrity of 19 inches when tested under vacuum.

Further, no seal has been obtained when using the aluminum nest at these controlled conditions. Increasing the dwell to three seconds yielded no seal.

No seal was obtained when using the flat stainless steel nest at standard conditions until the dwell had been increased to 3 seconds where a 13 inch vacuum seal was obtained.

Further, when using the serrated stainless steel heat sealing nest, a seal of 12 inches vacuum was obtained using the standard conditions. An increase in dwell time produced a seal of 16 inches vacuum at 320° F. At 1½ second dwell and at 360° F. a 16 inch vacuum seal was also obtained.

When using the Micarta type nest, overheating and no seal, due to cover distortion (puckering), resulted at 360°. No distortion was experienced at 1½ seconds at 360° with the serrated stainless steel nest.

Optimum seals of 19 inch vacuum were obtained with the serrated stainless steel nest at 1½ seconds and 380° temperature. Puckering did occur when using the flat stainless steel nest at the same conditions, resulting in no seal.

Thus, it will be seen that with only an increase of temperature of 60° or less, a serrated stainless steel heat seal nest would have a definite advantage over the other types of material and configurations. It is a durable nest material not subject to heat distortion or water absorption.

It has also been shown that the limited and controlled heat path through just the contact of the .005 inch serration radii with the flange of the aluminum foil container, that the acceptable heat seals can be made within presently known heat sealing machine parameters, and also that the slight controlled loss of heat prevents heat distortion of the foil closure, reducing heat seal failures caused by puckering.

The following chart is illustrative of the foregoing:

OIL CONTAINER AND CLOSURE HEAT SEALING NEST MATERIAL EVALUATION

Conditions of test—5,000 lbs. capacity heat seal press, 75 mm. 4 oz. aluminum container closure .002″ foil 2.5 lbs. vinyl heat seal

| Nest material | Dwell (sec.) | Total sealing force (lbs.) | Platen surface temp. (° F.) | Vacuum (in. H₂O) |
|---|---|---|---|---|
| Micarta | 1.0 | 1,507 | 300 | 15 |
| Do | 1.0 | 1,507 | 320 | 18 |
| Do | 1.25 | 1,507 | 320 | 19 |
| Do | 1.5 | 1,507 | 320 | 19 |
| Do | 1.5 | 2,011 | 320 | 19 |
| Do | 1.5 | 1,507 | 320 | 19 |
| Aluminum | 1.5 | 1,507 | 320 | 0 |
| Do | 3 | 1,507 | 320 | 0 |
| Flat S.S | 3 | 1,507 | 320 | 13 |
| Do | 2.5 | 1,507 | 320 | 12 |
| Do | 2 | 1,507 | 320 | 10 |
| Do | 1.5 | 1,507 | 320 | 0 |
| S.S.S | 1.5 | 1,507 | 320 | 12 |
| S.S.S | 2.0 | 1,507 | 320 | 16 |
| S.S.S | 1.5 | 1,507 | 360 | 16 |
| Micarta | 1.5 | 1,507 | 360 | Pucker |
| Do | 1.5 | 1,507 | 320 | 19 |
| S.S.S | 1.5 | 1,507 | 320 | 12 |
| S.S.S | 1.5 | 1,507 | 380 | 19 |
| Flat S.S | 1.5 | 1,507 | 380 | Pucker |

It will, therefore, be seen that in accordance with the present invention, there has been provided a reduced surface area, stainless steel heat seal nest in place of the conventional flat surface micartas nest or the nest currently used, so as to prevent the rapid transfer of heat from the sealing platen 19 on top through the cover 18 and container 12 into the actual nest 10. The nest is made of stainless steel for durability and the serrated surface 20 supplies limited contact to the metal container. Further, it offers some cushioning in high pressure areas for better sealing ring contact.

The present invention is especially adaptable for heat sealing formed containers, basically aluminum containers or any metal.

In the present invention, there is provided a means for controlling the flow of heat from a preformed container cover combination through to the supporting sealing nest. Primarily, the present invention provides a method of restricting the flow of heat from the cover container, flanged configuration through to the supporting heat sealing nest, by means of limited contact of a heat sealing nest to the container flange by reduction of the contact area of the heat seal nest. This can be accomplished by serrations or by simply using projections and a configuration that are actually close enough so that re-forming of the aluminum flange does not occur during sealing. Further, with the same configuration, if plastic containers were used, a better sealing could be obtained by having somewhat higher unit line or point pressure in the sealing area.

It is to be noted that in many heat sealing machines, serrations or gridding are used to create high unit heat seal pressures. These deal mostly with the sealing of flexible materials. In this case, rigid/flexible combinations are being dealt with. Where a plastic container is involved, this would also be true, but the primary purpose of the present invention is the use or supplying of a heat seal nest of stainless steel, or other suitable durable and moisture insensitive material, with a pseudo low thermo heat conductivity that will withstand the abuse of every day operation. Stainless steel, as an example, meets these requirements.

In addition, by having a designed contact surface, other than flat, the undesirable heat seal characteristics of this material and its usual robbing of heat during sealing procedure is eliminated. The present invention thus is a restricted thermo flow heat seal nest construction for aluminum foil containers and the like.

Due to the provision of the serrations and reduced area on the upper edge of the nest, sufficient heat is provided to seal the closure to the container, but the heat transfer will be controlled in such a manner that warping, puckering and the like of the container and lid will be prevented.

As shown in the drawings, the serrations may be in the form of concentric rings with their centers approximately .020 inches apart and with a .005 inch radius contact point. However, it is to be understood that the present invention is not limited to these dimensions.

It will, therefore, be seen that the present invention provides limited contact, affording adequate sealing support. During testing, working with a .050 inch wide heat seal support nest with contact serrations concentrically machined into the nest support flat, there was no evidence of the container flange being reformed by this support configuration, and this is an important feature.

In actual practice, the contact area can be much less than 10% of the total available heat seal area, since above that, it is believed that the path of heat flow would be too wide.

It will be seen that there has been provided a restricted thermo flow heat seal nest for container. The restricted area or serrations are in the top surface of the nest, and as shown in the drawings the points are radiused. The heat source may be of any desired type such as a hot mass plate 19, however other heat sources can be used such as an inductive, impulse element or the like. Also, the present invention is not limited to cylindrical containers since the containers may have any desired configuration. With the present invention the heat seal coatings of both the container and cover are activated.

It is to be understood that the material of the nest is not restricted to any particular material such as stainless steel, and the material is moisture insensitive. For example, the material may be of hard-chromed steel or Alphatized steel or any other material that does not conduct heat as fast as aluminum for example.

It will now be seen that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. Apparatus for controlling the flow of heat from a flat platen through a heat sealable material, said apparatus comprising a nest having a portion engageable with the heat sealable material opposite said flat platen, said portion having a plurality of spaced generally parallel ridges, the tops of said ridges being in substantially co-planar relationship and parallel with said platen, and said ridges extending substantially entirely across said portion, whereby the flow of heat from said material is controlled by said ridges.

2. The structure as defined in claim 1, wherein said nest is made of hard heat stable material.

3. The structure as defined in claim 1, wherein the top of each of the ridges includes a radiused point.

4. The structure as defined in claim 1, wherein said nest is generally cylindrical in cross section.

5. The structure as defined in claim 4, wherein said cylindrical nest has an outwardly sloping inner surface so that the thickness of said nest adjacent to said portion is less than the lower portion of said nest.

References Cited

UNITED STATES PATENTS

| | | | |
|---|---|---|---|
| 3,488,472 | 1/1970 | Pizarro | 53—329 |
| 3,613,489 | 10/1952 | Terry | 53—373 |
| 3,102,182 | 8/1963 | Oelze et al. | 156—69 |
| 3,481,100 | 12/1969 | Bergstrom | 53—329 |

DOUGLAS J. DRUMMOND, Primary Examiner

U.S. Cl. X.R.

53—329, 373

UNITED STATES PATENT OFFICE
CERTIFICATE OF CORRECTION

Patent No. 3,817,816     Dated June 18, 1974

Inventor(s) William E. R. Watt

It is certified that error appears in the above-identified patent and that said Letters Patent are hereby corrected as shown below:

In the heading to the printed specification, line 5, "Impaco, Allentown, Pa." should read -- Inpaco, Allentown, Pa. --.

Signed and sealed this 1st day of October 1974.

(SEAL)
Attest:

McCOY M. GIBSON JR.
Attesting Officer

C. MARSHALL DANN
Commissioner of Patents